Patented July 5, 1932

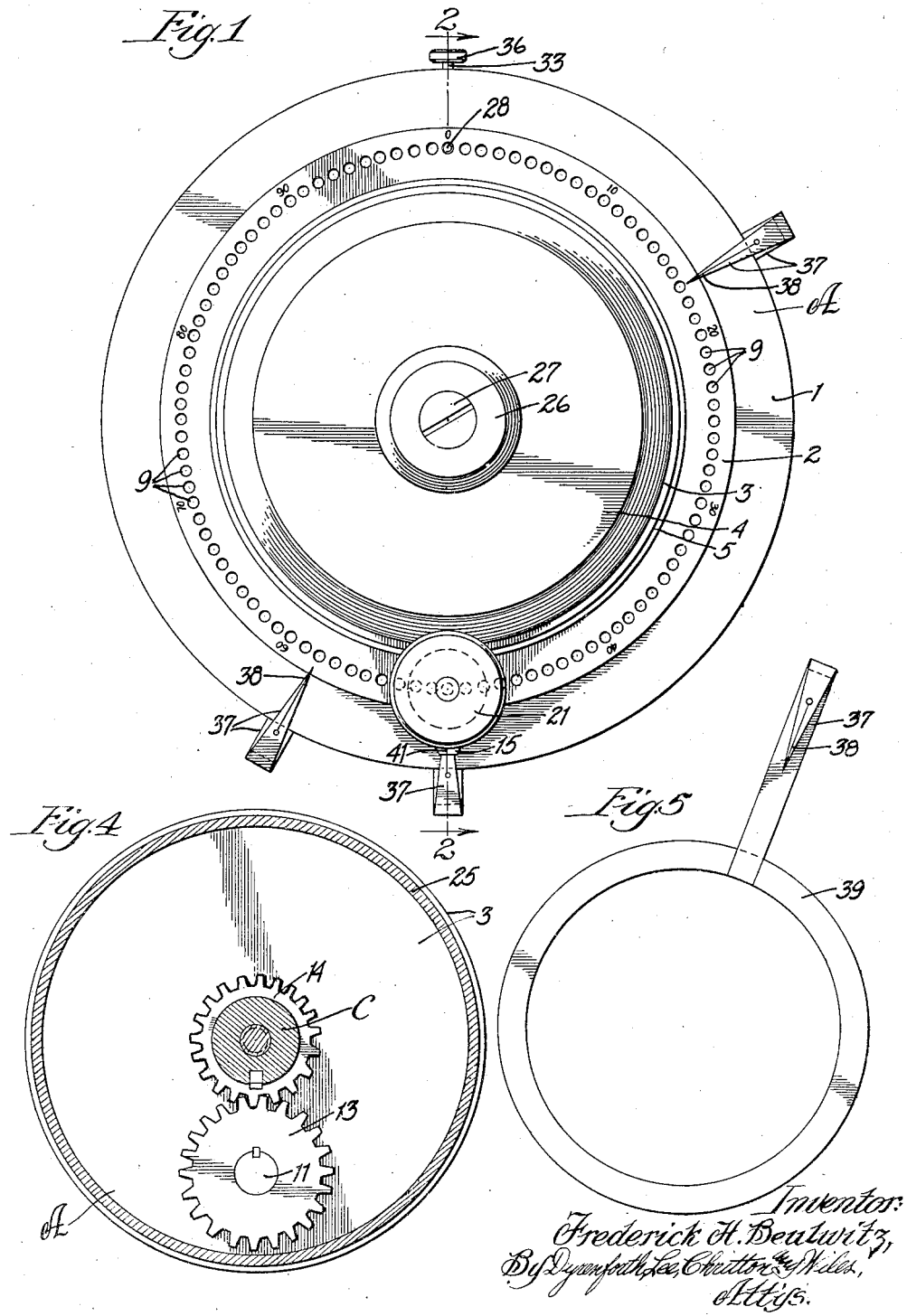

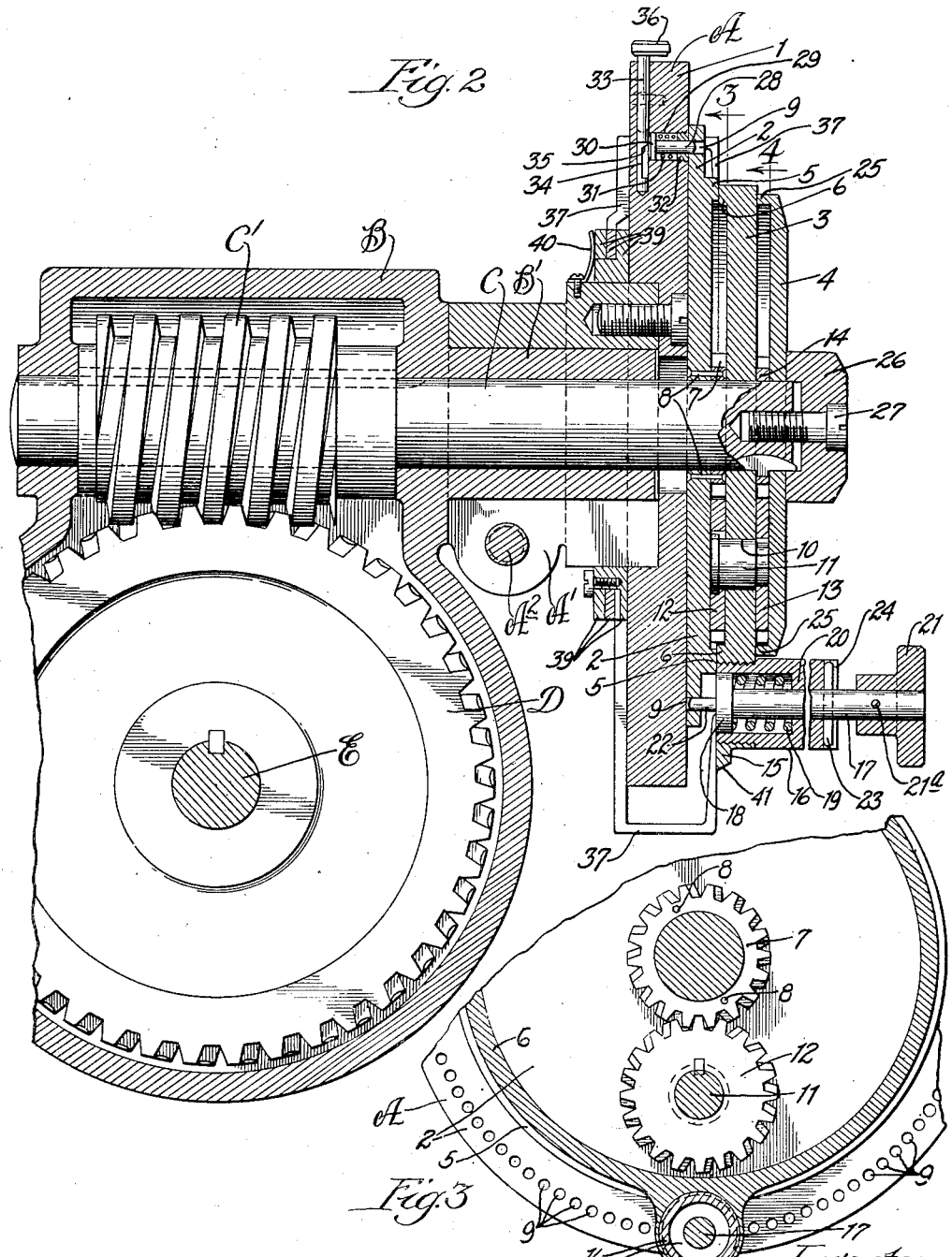

1,865,552

UNITED STATES PATENT OFFICE

FREDERICK H. BEULWITZ, OF MILWAUKEE, WISCONSIN, ASSIGNOR TO THE CINCINNATI MILLING MACHINE COMPANY, OF CINCINNATI, OHIO, A CORPORATION OF OHIO

INDEXING DEVICE

Application filed February 23, 1929. Serial No. 342,132.

This invention relates to indexing mechanism for dividing circles into whole or decimal parts and, also, permitting accurate angular rotation or adjustment of shafts and is more particularly adapted for use in connection with the turning or adjustment of objects, such as gear blanks, during the gear-cutting operation.

One of the primary objects is to provide simple and effective mechanism by which degrees of angular rotation of a shaft may be determined by the use of a scale and indexing mechanism and the shaft readily and accurately rotated in accordance with a reading on the scale.

Another object of the invention is to provide simplified means for reading upon a scale whole and fractional parts of complete revolutions and turning a shaft or object about the angle indicated by the reading. Another object is to provide a single scale upon which readings may be made in a uniform manner of integral numbers and decimal fractions and means whereby the value of said numbers and fractions may be transmitted to the shaft or object which it is desired to rotate.

Another object of the invention is to provide indexing mechanism and releasable locking means whereby the indexing mechanism may, at the option of the operator, be brought into direct connection with the shaft or, if desired, may be indirectly connected to the shaft through velocity reduction means. Other advantages and objects will appear as the specification proceeds.

The invention is illustrated in the accompanying drawings, in which—

Figure 1 is a front view in elevation of the indexing mechanism embodying my invention; Fig. 2, a sectional view, the section being taken as indicated at line 2 of Fig. 1; Fig. 3, a broken sectional view, the section being taken as indicated at line 3 of Fig. 2; Fig. 4, a sectional view, the section being taken as indicated at line 4 of Fig. 2; and Fig. 5, a detail view of a ring and the marker or pointer attached thereto.

As illustrated more clearly in Fig. 2, the indexing mechanism A is supported upon casing B in which shaft C is rotatably mounted. The shaft C carries a worm C' which meshes with worm gear D. Keyed to the gear D is an arbor E upon which a blank gear, or other object which is to be subjected to a cutting or other operation, may be supported.

The indexing apparatus A is secured to a reduced portion B' of casing B by means of a split sleeve member A' provided with a bolt A². The reduced portion B' of the casing, in the construction illustrated, provides a bearing for shaft C as well as a support for the clamping sleeve A'.

The indexing apparatus A comprises a large base plate 1, a rotatably mounted disk 2, an index member or plate 3, and a cover plate 4, plates 2, 3 and 4 being centrally apertured to receive shaft C.

The base plate 1 is preferably a large solid metal plate rigidly secured to the split sleeve member A' by bolts or other suitable means. It is preferably provided on its front or outer side with a smooth bearing surface which the rotatable disk 2 may engage.

The disk 2 is rotatably carried by the shaft C. It is preferably provided on its rear side with a smooth face so as to reduce friction as much as possible in its engagement with plate 1. The disk 2 is also provided with a raised rim or annular flange 5 which serves as a bearing for a similar inverted rim or annular flange 6 with which the index plate 3 is provided. A fixed spiral gear 7, having a large central opening through which the shaft C passes, is secured in the central portion of the disk 2 by means of pins 8.

As will be seen more clearly in Fig. 1, the disk 2 is provided near its periphery with spaced perforations 9. These perforations are of equal diameter and are an equal distance apart. Preferably, there are one hundred of such perforations arranged in a continuous circle near the edge of the disk 2. In the illustration given, the perforations are marked in units of ten, the numbers being stamped on the face of the disk just above the perforations.

The index plate 3 is equipped with a depending annular flange member 6 which makes bearing contact with the flange 5 of disk 2. The index plate is apertured off center at 10 and provided with a short shaft 11 upon which are keyed, on opposite sides of the plate, spiral gear 12 and spur gear 13. When the plate 3 is placed in position, the spiral gear 12 meshes with the fixed spiral gear 7 and the spur gear 13 meshes with a gear 14 which is keyed to shaft C.

Formed integrally with the index plate 3 is a protuberance or ear 15 which is perforated and threaded to receive the lower threaded portion of a tubular handle 16. Mounted within the tubular handle 16 is a plunger 17 which is provided at its lower end with a disk 18 which affords a bearing shoulder for the coil spring 19. The tubular handle is preferably closed at its upper end by a cover 20 which serves also to support one end of the spring 19. The upper end of the plunger 17 is provided with a finger piece 21 which may be secured to the plunger by any suitable means, such as by a bar 21ᵃ. Pin 22, which is preferably formed integrally with the disk 18, depends therefrom, and is adapted to engage the perforations 9 in the disk 2. The plunger 17 is apertured near its upper portion to receive a cross-pin 23, the cross-pin normally resting within a slot 24 in the cover member 20 when the pin is in lowered position and in engagement with the perforations 9 of disk 2. When the pin is retracted so as not to engage the perforations 9, it may be held out of position by turning the plunger 17 so that the cross-pin rests upon the outer surface of the cover member 20.

The cover plate 4 preferably is equipped with a depending flange 25 which engages the upper surface of index plate 3. It is apertured centrally to permit the shaft C to pass through.

An inverted cup-shaped cap 26 is employed to cover the end of the shaft and to hold the various plate members in position. It is provided centrally with an opening through which a cap screw 27 extends and engages a threaded opening in the end of shaft C.

In order to lock disk 2 against rotation, a spring-pressed plunger mechanism is employed. This mechanism comprises a pin 28 supported horizontally within a recess 29 in plate 1 and provided at its lower end with a cam-shaped member 30. A coil spring 31 is supported by a fixed abutment 32 in the upper part of the recess and normally presses the pin 28 in an outward direction. Slidably mounted in a channel which runs at right angles to the recess 29 is a plunger 33 which is provided near its inner end with a cut-away portion 34 and a cam face 35. A button 36 is secured to the outer end of the plunger to facilitate its operation. When the plunger is retracted, the cam-shaped disk 30 drops into the cut-away portion 34 of the plunger 33 and thus withdraws the pin 28. When the plunger is thrust inwardly, the cam face 35 engages the bevelled edge of disk 30 and thus elevates the pin.

To aid in the operation of the indexing mechanism, markers 37 are employed. These are provided at their outer ends with points 38 which are easily alined with perforations 9. The markers are supported upon rotatable rings 39, which encircle the sleeve member A', and may be held in compact arrangement by means of spring fingers 40. The markers may be secured to the rings in any suitable manner, such as, by soldering.

The spur gears 13 and 14 and the spiral gears 7 and 12 are so designed as to operate as an epicyclic train, gears 13 and 12 moving around gears 14 and 7, respectively. The gear ratio is such as to bring the relative velocity of rotation of the indexing plate 3 and of the shaft C to the ratio of 100 to 1. In order to obtain the proper distance between centers with respect to gears 7 and 12, spiral gears are preferably employed. They have been found to be particularly adapted for use in the indexing mechanism described.

If desired, in order to easily aline the tubular handle with one of the perforations in disk 2, the protuberance or ear 15 of the index plate 3 may be provided with a pointer 41.

The operation of the apparatus, with the parts assembled as shown in Fig. 2, is as follows. When it is desired to index an integral number, the pin 28 is withdrawn from engagement with perforations 9 in disk 2 by retracting plunger 33 and pin 22 is caused to engage perforations 9 by allowing the cross-pin 23 to enter slot 24. The beginning point having been marked with one of the markers 37, the tubular handle is rotated as many times as is the value of the integral.

When it is desired to index a decimal in hundredths, the operation is the same as for the indexing of integral numbers, except that a complete rotation is not made, the handle being stopped after a number of perforations corresponding to the decimal have been counted from the starting marker. It will be observed that in indexing integral numbers and decimals in hundredths, the disk 2 is free to rotate and is engaged only by the pin 22 carried within the tubular handle.

When it is desired to index decimals in ten thousandths, the first two figures of the decimal are indexed as described above in connection with indexing decimals in hundredths. The remaining two figures of the fraction are found in the following manner. The plunger 33 is thrust inwardly so as to cause pin 28 to enter one of the perforations 9 and thus lock the disk 2 against rotation. At the same time, the pin 22 is withdrawn from engagement with the perforations 9 of disk 2 and the plunger is turned so that the cross-pin holds pin 22 out of engagement. The tubular handle is then turned until a number of perforations have been counted from the starting marker to correspond to the last two numbers of the decimal.

It will be observed that the operation for finding ten thousandths is exactly the same as that of finding the first two figures, or hundredths, of the decimal, the only difference being in the manipulation of the locking members 22 and 28, i. e., in finding the first two figures, the disk is allowed to rotate and the index plate and disk rotate together. Inasmuch as the gears are carried by these two plates, they act as fixed connections with the shaft C and cause it to turn just as though keyed to the plates. In the operation for finding the last two figures of the decimal, the disk 2 is locked by pin 28 and the index plate 3 rotates apart from disk 2.

In the latter operation, the reduction gears are brought into action. The gear 7, being fixed to the disk 2, which is now locked, causes the gear 12 to turn as the index plate 3 is rotated and as the gear 12 moves around gear 7. Gear 13, being fixed upon the same shaft to which gear 12 is keyed, must also rotate as it moves around gear 14. The diameters of the various gears are so proportioned as to give a velocity reduction of the ratio of 100 to 1. Thus, when the disk 2 is locked and the index plate is rotated until the handle pointer 41 has counted off a number of perforations equal to the last two numbers of a decimal, the number found on the scale of one hundred points will have been divided by the reduction gears to obtain the last two figures in the decimal.

As an illustrative example, if the decimal to be indexed is .0859, the apparatus may be operated in the following preferred manner. One pointer is set at the starting point which, as illustrated in Fig. 1, happens to be at the fifty mark. Eight marks are then counted off in a clockwise direction and a marker set at this point. Fifty-nine marks are then counted off and indicated with a marker. The index handle is then moved eight points from the starting marker to the second marker, carrying with it disk 2, which is engaged only by pin 22. Pin 22 is then withdrawn from the perforations and locked in withdrawn position and at the same time, disk 2 is locked against rotation by pin 28. The index handle is then moved the remaining fifty-nine points in a clockwise direction to the third marker. Thus, by two operations, the decimal .0859 has been indexed, first the figure .08 having been found and then, in a similar manner and on the same scale, the figure .0059, both bi-numerals having their proper value accurately transmitted to the shaft.

An angle of a specified number of degrees may be indexed by finding the fractional relation of the number of degrees to the total number of degrees in a revolution and indexing the decimal as described above.

While I have preferred to employ a disk having a hundred perforations, in order to adapt the device to the decimal system, it is apparent that plates having perforations of any number of units of ten may also be adapted for use with decimals and it is obviously within the spirit of the invention to use disks having any number of perforations.

While I have shown but one scale or series of perforations, if desired, additional scales or series of openings may be used. And, if it is desired to index decimals less than ten thousandths, additional reduction gears may be employed to carry out this purpose, obviously without departing from the scope of my invention.

The foregoing detailed description has been given for clearness of understanding only, and no unnecessary limitations should be understood therefrom but the appended claims should be construed as broadly as permissible, in view of the prior art.

What I regard as new, and desire to secure by Letters Patent, is:

1. In a device of the character set forth, a rotatably mounted shaft, a disk carried by said shaft and provided with a circular scale consisting of spaced perforations, an index member carried by said shaft and provided with means for releasably engaging said perforations, releasable locking means serving to restrain said disk against rotation, fixed gears secured to said disk and to said shaft, planetary gears carried by said index member and meshing with said fixed gears, said gear connections serving to cause said shaft to rotate at the same speed with said index member when said disk is free to rotate and to cause said shaft to rotate at a reduced pre-determined relative speed when said disk is locked against rotation.

2. In a device of the character set forth, a rotatably mounted shaft, a plate supported adjacent thereto, a rotatable index member supported adjacent said plate, fixed gears carried by said plate and said shaft, and gears carried by said index member and meshing with said fixed gears.

3. In a device of the character set forth, a rotatably mounted shaft, a plate supported adjacent said shaft, a rotatable index member supported adjacent said plate, a fixed spiral gear carried by said plate, a spiral gear carried by said index member and meshing with said first-mentioned spiral gear, a second gear carried by said index member being connected to and driven by said spiral gear of said index member, and a fixed gear secured to said shaft meshing with said second gear.

4. In a device of the character set forth, a rotatably mounted shaft, a base plate fixedly secured relative to said shaft, a second plate supported adjacent thereto, a rotatable index member supported adjacent said second plate, fixed gears carried by the second plate and said shaft, gears carried by said index member and meshing with said fixed gears, and means for releasably connecting said first mentioned plate to said second mentioned plate.

5. In a device of the character set forth, a support member, a shaft rotatably mounted in the support member, a plate supported by the shaft adjacent said member, a rotatable index member supported by the shaft adjacent said plate, releasable locking connections between said plate and support member, fixed gears carried by said plate and said shaft, and gears carried by said index member and meshing with said fixed gears.

6. In a device of the character set forth, a support member, a shaft rotatably mounted in the support, a plate supported by the shaft adjacent the support member, a rotatable index member supported adjacent said plate, a fixed gear carried by said plate, a rotatably mounted gear carried by said index member and meshing with said fixed gear, a second gear rotatably carried by said index member being connected to and driven by said first mentioned rotatably mounted gear of said index member, and a fixed gear secured to said shaft meshing with said second gear.

7. In a device of the character set forth, a rotatably mounted shaft, a disk carried by said shaft and provided with a circular scale, said scale consisting of one hundred spaced recesses, an index member carried by said shaft and provided with means for releasably engaging said recesses, releasable locking means serving to restrain said disk against rotation, fixed gears secured to said disk and to said shaft, and planetary gears carried by said index member and meshing with said fixed gears, said gear connections causing said shaft to rotate at the same speed with said index member when said disk is free to rotate and to cause said shaft to rotate at a reduced predetermined relative speed when said disk is locked against rotation.

8. In a device of the character set forth, a rotatably mounted shaft, a rotatable index member supported by the shaft, speed reduction gears, at least one of which is connected to said shaft, releasable means connecting said index member directly to said shaft, and releasable means connecting said index member to one of said gears, said first mentioned means serving to cause said shaft to rotate at the same speed with said index member and said second mentioned connecting means being adapted to cause said shaft to rotate at a reduced predetermined relative speed.

9. In a device of the character set forth, a rotatably mounted shaft, reduction gears having a connection with said shaft, a plate provided with a scale supported concentrically on said shaft, a rotatably mounted index member on the shaft associated with said plate, and means for releasably locking said index member to said shaft so as to turn therewith and means for releasably connecting said index member with one of said reduction gears.

10. In a device of the character set forth, a rotatably mounted shaft, cooperating members supported concentrically on the shaft, one of said cooperating members being a disk provided with a scale, said scale consisting of one hundred spaced recesses, and said other cooperating member being an index member, releasable locking means associated with said index member and said recesses, speed reduction gears carried by said disk and said index member and connected to said shaft whereby said shaft may be caused to rotate at a reduced predetermined relative speed, and releasable connecting means locking said disk with said shaft whereby said shaft is caused to rotate with said disk.

11. In a device of the character set forth, a rotatably mounted shaft, a stationary base plate supporting said shaft, a second plate supported on the shaft adjacent said first mentioned plate, releasable locking means between said plates, a rotatable index member supported adjacent said second mentioned plate, fixed gears carried by the second mentioned plate and said shaft, and gears carried by said index member and meshing with said fixed gears.

12. In a device of the character set forth, a rotatably mounted shaft, speed reduction gears supported adjacent thereto and having a connection with said shaft, a rotatably mounted indexing arm movable concentrically about the shaft, releasable locking means between said shaft and arm whereby said shaft moves directly with said arm, and releasable connecting means between said indexing arm and said reduction gears whereby said shaft moves at a slower rate than said arm.

13. In a device of the character set forth, a base member, a shaft rotatably mounted in said base member, means coupling one end of the shaft to a rotatable work holder, an index arm, speed reduction gears interposed between the arm and said shaft, one of said gears being connected to the shaft, releasable connecting means adapted to connect said index arm directly to said shaft for actuation thereby, and releasable connecting means connecting said index arm to one of said reduction gears to effect rotation of the shaft at a reduced rate relative to the arm.

In testimony whereof I have hereunto set my hand this 15th day of February, 1929.

FREDERICK H. BEULWITZ.